United States Patent
Sadowski

(10) Patent No.: US 10,872,047 B2
(45) Date of Patent: Dec. 22, 2020

(54) METHOD AND APPARATUS FOR PROCESSOR STANDBY

(71) Applicant: Advanced Micro Devices, Inc., Santa Clara, CA (US)

(72) Inventor: Greg Sadowski, Cambridge, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 142 days.

(21) Appl. No.: 16/042,912

(22) Filed: Jul. 23, 2018

(65) Prior Publication Data

US 2018/0329842 A1 Nov. 15, 2018

Related U.S. Application Data

(62) Division of application No. 14/326,579, filed on Jul. 9, 2014, now Pat. No. 10,055,370.

(51) Int. Cl.
| | | |
|---|---|---|
| *G06F 1/3287* | (2019.01) | |
| *G06F 13/28* | (2006.01) | |
| *G06F 13/42* | (2006.01) | |
| *G06F 1/3203* | (2019.01) | |

(52) U.S. Cl.
CPC .......... *G06F 13/28* (2013.01); *G06F 1/3203* (2013.01); *G06F 1/3287* (2013.01); *G06F 13/4282* (2013.01); *Y02D 10/00* (2018.01); *Y02D 30/50* (2020.08)

(58) Field of Classification Search
None
See application file for complete search history.

(56) References Cited

U.S. PATENT DOCUMENTS

| | | | | |
|---|---|---|---|---|
| 6,065,124 A | * | 5/2000 | Lee | G06F 1/3225 713/323 |
| 6,212,599 B1 | * | 4/2001 | Baweja | G06F 1/3225 365/226 |
| 2006/0253716 A1 | * | 11/2006 | Dhiman | G06F 1/30 713/300 |
| 2007/0011536 A1 | | 1/2007 | Khanna | |
| 2009/0204837 A1 | | 8/2009 | Raval | |
| 2009/0292934 A1 | * | 11/2009 | Esliger | G06F 1/3203 713/323 |
| 2010/0278000 A1 | * | 11/2010 | Bhakta | G06F 1/3225 365/226 |

(Continued)

OTHER PUBLICATIONS

U.S. Patent and Trademark Office; Non-Final Rejection; U.S. Appl. No. 14/326,579; dated Sep. 21, 2016.

(Continued)

*Primary Examiner* — Thomas C Lee
*Assistant Examiner* — Gary Collins
(74) *Attorney, Agent, or Firm* — Faegre Drinker Biddle & Reath LLP

(57) ABSTRACT

A method of and device for removing a processor from a low power mode. The method includes and the device provides for performing multiple processor start-up tasks in parallel. Memory interface training between the processor and memory and restoration and initialization of the processor are performed in parallel with each other and with a serial bus controller entering serial bus training to facilitate communication between the processor and a system controller.

18 Claims, 6 Drawing Sheets

(56) References Cited

U.S. PATENT DOCUMENTS

| | | |
|---|---|---|
| 2010/0325372 A1 | 12/2010 | Housty |
| 2011/0131432 A1* | 6/2011 | Berke .................. G06F 1/3203 |
| | | 713/320 |
| 2011/0264934 A1* | 10/2011 | Branover ............. G06F 1/3203 |
| | | 713/320 |
| 2011/0296095 A1* | 12/2011 | Su ...................... G06F 12/0292 |
| | | 711/105 |
| 2012/0284576 A1 | 11/2012 | Housty |
| 2012/0317607 A1 | 12/2012 | Wyatt |
| 2013/0027413 A1 | 1/2013 | Jayavant |
| 2013/0038615 A1 | 2/2013 | Hendry |
| 2013/0067127 A1 | 3/2013 | Hopgood |
| 2013/0326206 A1* | 12/2013 | Lueck .................. G06F 9/4418 |
| | | 713/2 |
| 2014/0032947 A1 | 1/2014 | Ahmad |
| 2014/0082724 A1* | 3/2014 | Pearson ............... G06F 21/575 |
| | | 726/22 |
| 2014/0149767 A1 | 5/2014 | Kim |
| 2014/0215245 A1 | 7/2014 | Zhang |
| 2015/0095687 A1 | 4/2015 | Spry |
| 2016/0011652 A1 | 1/2016 | Sadowski |

OTHER PUBLICATIONS

U.S. Patent and Trademark Office; Non-Final Rejection; U.S. Appl. No. 14/326,579; dated Apr. 27, 2017.

U.S. Patent and Trademark Office; Final Rejection; U.S. Appl. No. 14/326,579; dated Nov. 14, 2017.

\* cited by examiner

METHOD AND APPARATUS FOR PROCESSOR STANDBY

CROSS-REFERENCE TO RELATED APPLICATIONS

This application is a divisional application of U.S. patent application Ser. No. 14/326,579, filed on Jul. 9, 2014, entitled METHOD AND APPARATUS FOR PROCESSOR STANDBY, owned by instant assignee and incorporated herein by reference.

FIELD OF THE DISCLOSURE

The present disclosure is related to methods and devices for facilitating low power modes of processors and startup of those processors from low power modes. The present disclosure is related more specifically to methods and devices facilitating rapid startup of processors (e.g., GPU's) from low power modes.

BACKGROUND

Computing devices often have one or more processors (e.g., CPUs, GPUs, APUs, DSPs, etc.). Such processors sometimes experience periods of low use or non-use. In order to conserve power, such as battery power, it is desirable to reduce or eliminate power being provided to such processors during the period of low and/or non-use. Subsequent periods of increased use require that the processor be receive increased power, relative to the low/no power state, and be reinitialized and prepared to operate as part of the larger computing device. Such re-initialization and preparation takes time. In some instances, the time needed for such re-initialization and preparation creates a noticeable and undesirable waiting period between when processor operation is called for and when processor operation can be provided.

One such example is shown in FIG. 1. When power is to be conserved, system controller 100 removes power from processor 110, such as a graphics processor on a graphics card, by opening switch 120. Removal of power from processor 110 removes power from system management unit 130 within processor 110. Removal of power from processor 110 further removes power from memory PHY 140 of processor 110. Removal of power from processor 110 still further removes power from (and thus the data contents of) volatile memory 150 supported by processor 110. Loss of power by processor 110 also results in loss of training data that enables increased efficiency in communication between processor 110 and volatile memory 150. Similarly, loss of power by processor 110 causes the loss of training data that enables increased efficiency in communication between processor 110 and the rest of the system (such as via PCIe Bus 160).

Upon subsequent startup, re-initialization and preparation for processor 110 is conducted. An exemplary and simplified process of re-initialization and preparation is shown in FIG. 2. It should be appreciated that the times shown in FIG. 2 are intended to be exemplary and not exact. Processor 110 initially receives power via closing of switch 120. Processor 110 receives power, 200, within a few milliseconds and starts a reset process. The reset process, 210, loads onboard instructions and then begins to establish trained communication over the PCIe bus 160, at 220.

Processor 110 then proceeds to train the memory bus between processor 110 and memory 150, at 240. Once the memory bus is trained, context data and processor state data is obtained via the trained PCIe bus 160 and stored in memory 150. This context data and processor state data describe the desired state of the processor that enables use thereof. The context data and processor state data allow processor 110 to perform restoration and initialization, 250.

Once the processor state is restored, an I/O memory management unit (IOMMU) is updated, 230. One such I/O memory management unit is a graphics address remapping table (GART) (although other IOMMUs are known). The data for such an update is obtained via the trained PCIe Bus 160.

Overall, as shown in FIG. 2, various events that occur to provide a functional processor upon wake-up or power-up are performed serially. Thus, the overall time needed to achieve startup is an additive function of all the sub-parts that need to be completed. It should be appreciated that additional events and processes are expected to be required to provide a functional processor upon wake-up. At least a portion of these additional events are expected to also be performed serially and thus contribute to the overall time needed to achieve startup.

Such compounding of time can produce a delay in achieving readiness at processor 110. Alternatively, always maintaining processor 110 in a fully powered mode leaves processor 110 always at the ready without power-up delays. However, this readiness comes at the price of the power consumption needed to achieve this readiness. Accordingly, there exists a need for power savings for processors with decreased startup times when exiting a power saving mode.

DETAILED DESCRIPTION OF EMBODIMENTS

In an exemplary and non-limited embodiment, aspects of the invention are embodied in a method of removing a processor from a low power mode. The method includes performing multiple processor start-up tasks in parallel. Memory interface training between the processor and memory and restoration and initialization of the processor are performed in parallel with each other and with a serial bus controller entering serial bus training to facilitate communication between the processor and a system controller.

In another example, a method of holding a processor in a low power mode is provided including storing context data in local memory of the processor, context data indicating a desired state of the processor upon exiting the low power mode; storing pointers to the context data in a system controller memory; and maintaining the portion of the volatile memory identified by the pointers while the processor is in the lower power mode.

In yet another example, a method of placing a processor in a low power mode is provided including: storing processor state information in volatile memory of the processor; storing pointers to locations within the volatile memory where the state information is stored; placing the volatile memory into a self-refresh mode; engaging an external controller to facilitate the self-refresh mode; and placing the processor into a low power mode such that the processor is unable to facilitate the self-refresh mode.

In another example, a computing device is provided including: a processor; a system controller; a first volatile memory of the processor, the first volatile memory storing first information regarding a desired state for the processor; a second memory storing data pointers to the first information, the second memory being accessible to a system controller; and a controller operable to manage the refreshing of the first volatile memory while the processor is in a low power mode.

In still another example, a computer readable medium is provided that contains non-transitory instructions thereon, that when interpreted by at least one processor cause the at least one processor to perform memory interface training between the processor and memory, and perform restoration and initialization of the processor; the interface training and restoration/initialization both being performed simultaneously with each other and with a serial bus controller entering serial bus training for communication with the processor.

Figure 1:
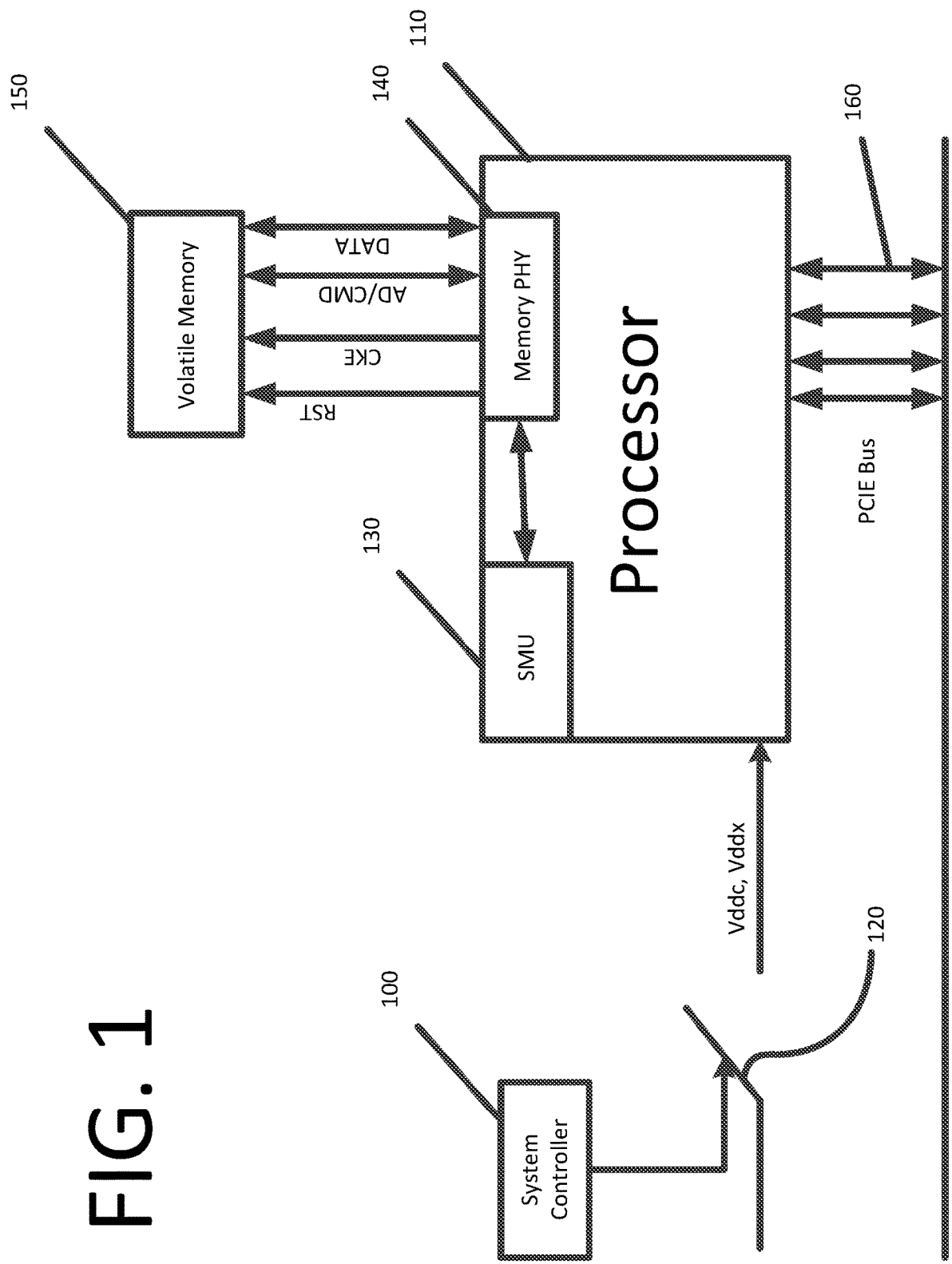
FIG. 1 is a diagram showing exemplary architecture of a system employing bus communications to a processor having a low power mode.
Figure 2:
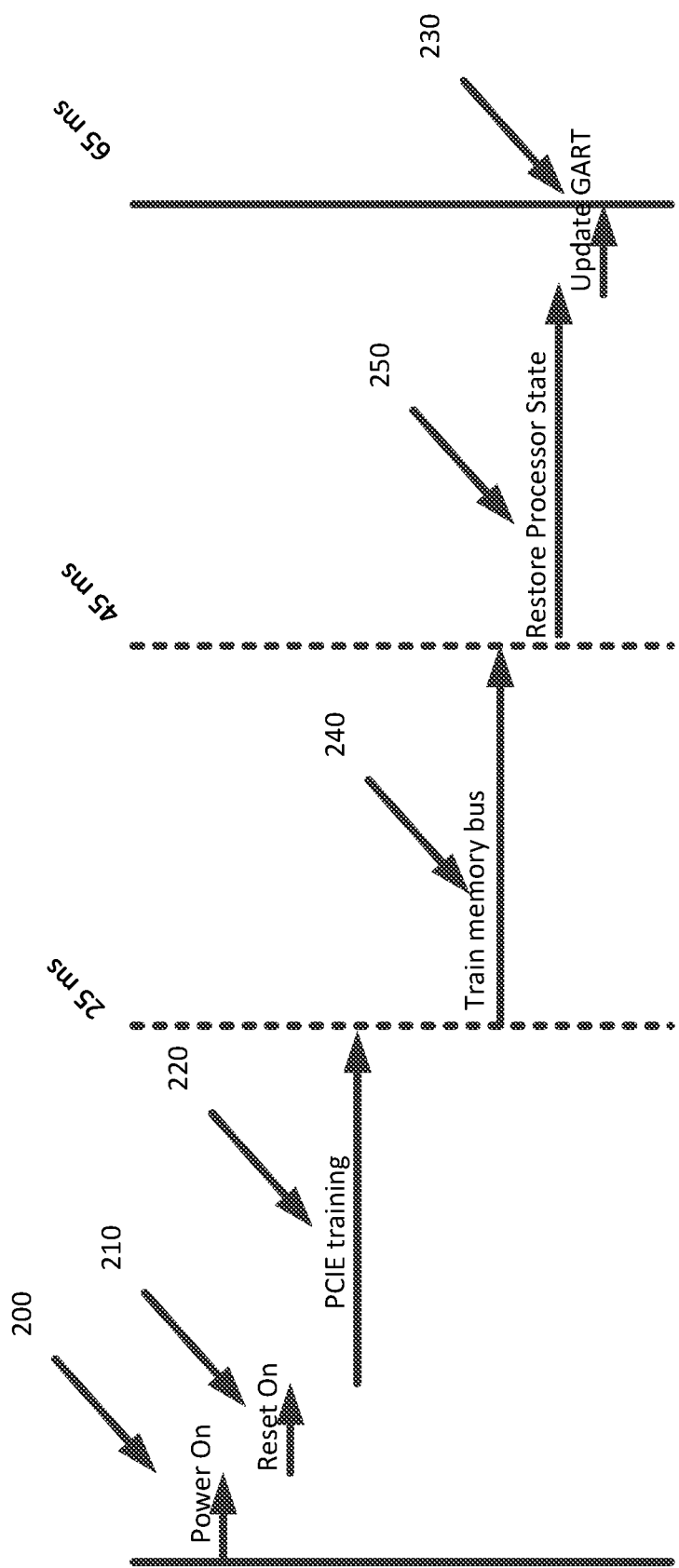
FIG. 2 is a representation of timing of events involved in a power up sequence for the system of FIG. 1.
Figure 3:
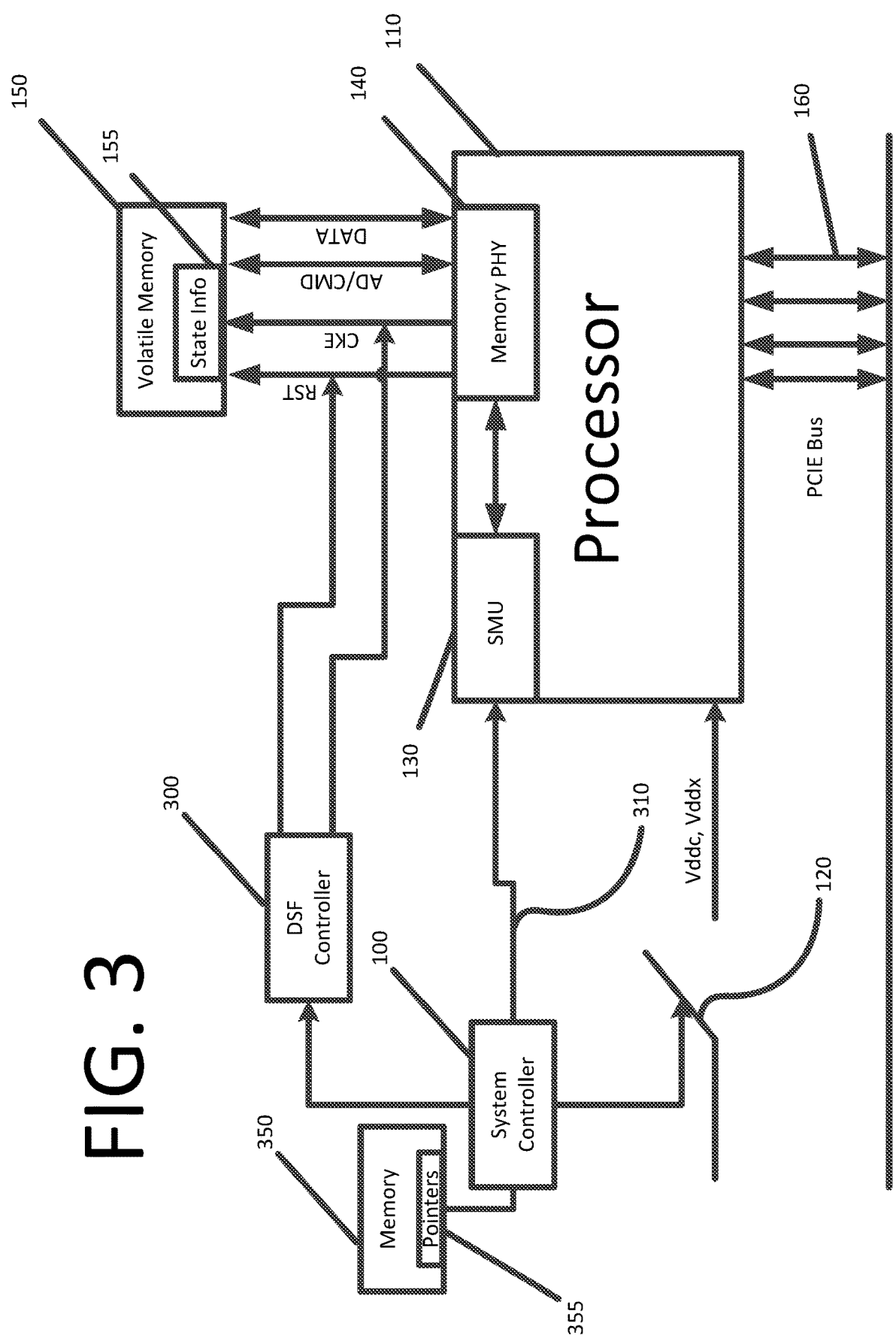
FIG. 3 is a diagram showing exemplary architecture of a system employing processor power-up readiness hardware and functionality according to an embodiment of the present disclosure.
Figure 4:
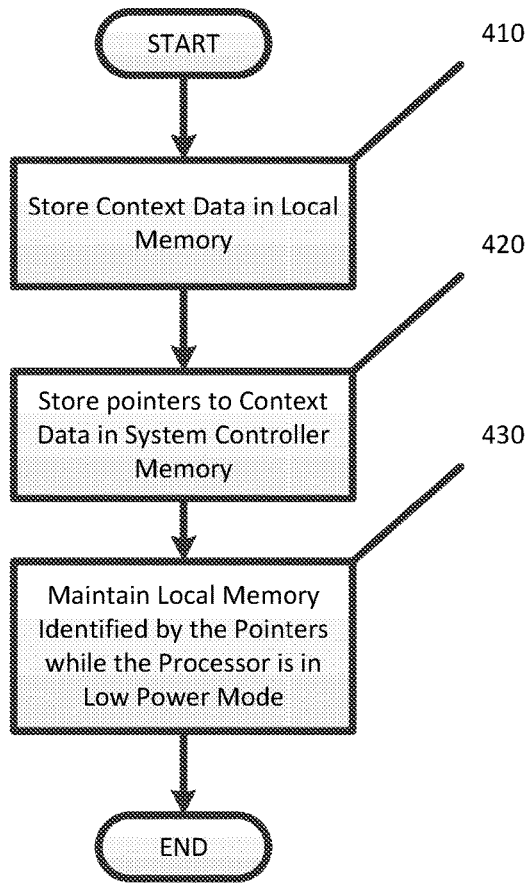
FIG. 4 is a flowchart showing an embodiment of operation that facilitates processor power up in accordance with an embodiment of the present disclosure.
Figure 5:
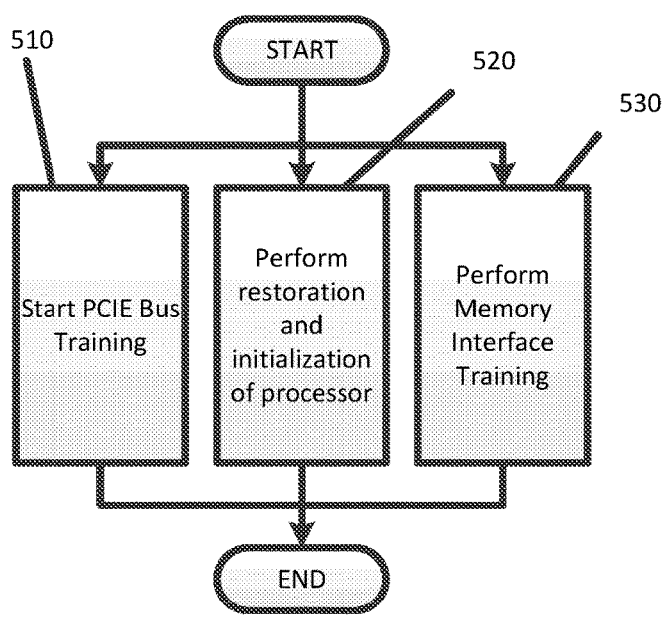
FIG. 5 is a flowchart showing an embodiment of operation of powering up a processor in accordance with an embodiment of the present disclosure.
Figure 6:
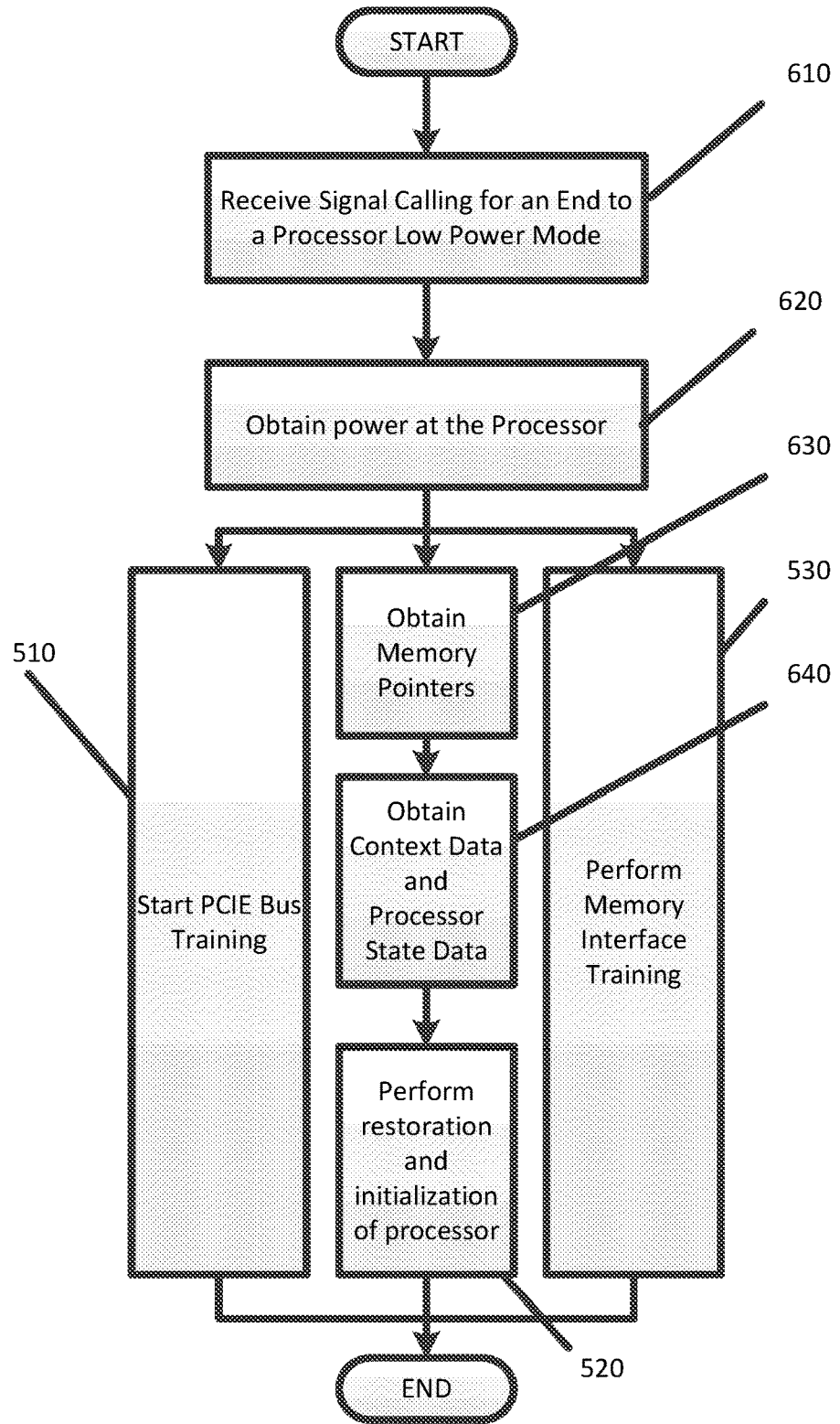
FIG. 6 is a flowchart showing another embodiment of operation of powering up a processor in accordance with an embodiment of the present disclosure.
Figure 7:
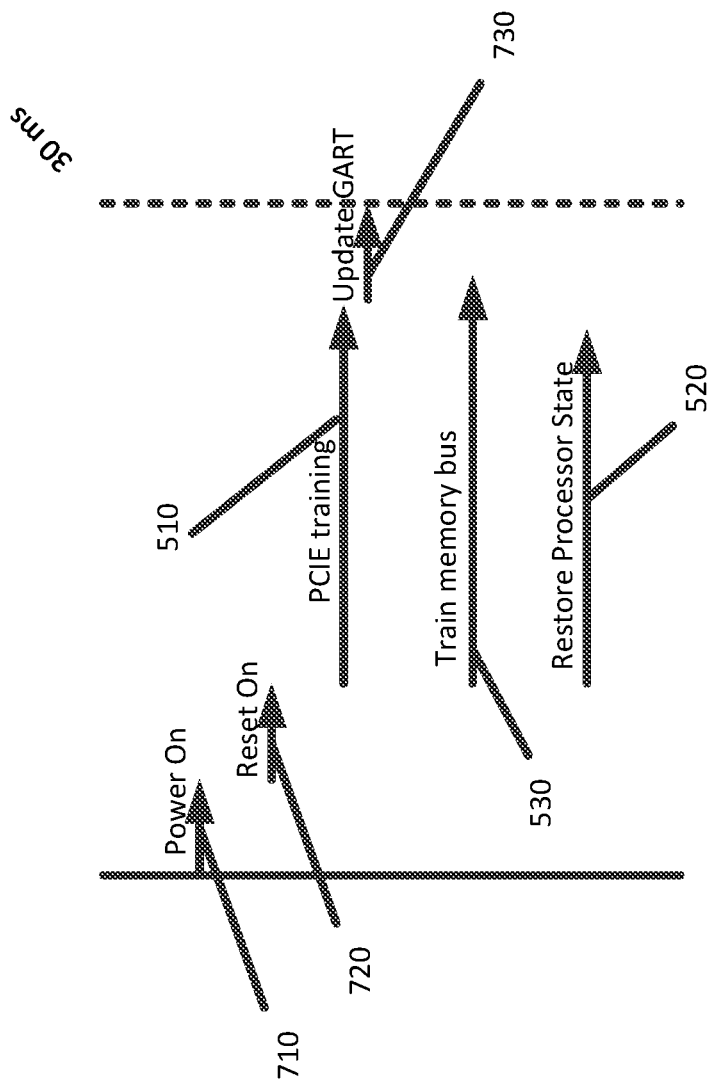
FIG. 7 is a representation of timing of events involved in a power up sequence for the system of FIG. 3 according to an embodiment of the present disclosure.

FIG. 3 shows architecture for providing parallel processing of startup operations for processor 110 that operates over serial bus 160. The architecture includes system controller 100, processor 110, switch 120, volatile memory 150, PCIe bus 160, and refresh controller 300.

In one embodiment, system controller 100 is a central processing unit (CPU) and processor 110 is a discrete graphics processing unit (dGPU). However use of the presently disclosed techniques and hardware is envisioned for processors generally and, thus could be alternatively embodied in systems including only CPUs APUs (processors combining CPU and GPU functionality), digital signal processors (DSPs), and various combinations of the forgoing. Even more specifically, in one embodiment, processor 110 is a GPU located on a removable PCIe graphics card in a desktop computer. System controller 100 executes operations, such as those proscribed by a graphics driver to control processor 110. System controller 100 primarily communicates with processor 110 via PCIe bus 160. PCIe bus 160 is a communications bus that can assume multiple settings. Changes in these settings allow different communication speeds and different communication robustness. Different settings are iteratively tested to find the settings that give more desirable properties. This iterative process is referred to as link training.

Processor 110 includes system management unit (SMU) 130 as well as memory PHY 140. SMU 130 communicates with PHY 140 to control accesses of and data pushes and pulls from volatile memory 150. During normal operation, processor 110 provides reset (RST) and clock enable (CKE) signals to volatile memory 150. RST and CKE signals provide the ability for volatile memory to hold data therein. When processor 110 is off or in a low power mode, such as when system controller 100 opens switch 120, processor 110 is unable to provide the RST and CKE signals. Without RST and CKE signals, volatile memory loses the data stored therein. In one embodiment, volatile memory 150 is dedicated volatile memory with respect to processor 110 (dedicated memory 150 is exclusively provided to processor 110 such that read/write operations thereon are restricted to being via processor 110).

DRAM self-refresh (DSF) controller 300 selectively supplies RST and CKE signals to volatile memory 150. In one embodiment, DSF controller 300 is state logic that is located on a computer motherboard in close proximity to a PCIe socket that couples to a graphics card containing processor 110.

System controller 100 maintains a secondary line of communication 310 with SMU 130 of processor 110. This secondary line of communication is illustratively an Inter-Integrated Circuit ($I^2C$) bus or other type of bus. It should be appreciated that the $I^2C$ bus is a relatively low-speed connection relative to PCIe and thus only lower amounts of data can be efficiently transmitted thereacross.

Having discussed parts of the system, the discussion now turns to the process of placing processor 110 into a low power state, maintaining settings for processor 110 while in the low power state, and finally taking processor 110 out of the low power state.

In operation, processor 110 operates in a state and such state is reflected in data (state info) 155 stored in volatile memory 150, block 410. The state data is stored via a process such as or akin to a context switch such that the data provides for resumption of execution of processes at a later time. In one embodiment, this stored state is the state that processor 110 is desired to resume when coming out of a low power mode. During normal operation, processor 110 writes to and reads from memory 150 via memory PHY 140. Processor 110 further issues RST and CKE signals to maintain the data in memory 150.

When it is desired that processor 110 enter a low power mode, functions are executed to prepare therefor. Memory 150 is placed into a self-refresh mode. The self-refresh mode allows a system to suspend operation of its DRAM controller to save power without losing data stored in DRAM. A portion of the context data is stored in non-volatile memory 350 that system controller 100 has access to (and that SMU 130 of processor 110 has access to via secondary line of communication 310). Pointers 355 to the locations within memory 150 holding the context data are also stored in non-volatile memory 350, block 420.

Refresh controller 300 is illustratively a programmable pull-up circuit. In one embodiment refresh controller 300 is a board level circuit. However, embodiments are envisioned where the functionality is embodied in dGPU ASIC or in the DRAM. Refresh controller 300 is driven by system controller 100. System controller 100 accesses memory 350 to access the saved pointers and to determine which portions of volatile memory 150 contain the context information. System controller 100 then uses this information to cause refresh controller to issue RST and CKE signals for memory 150. Thus, refresh controller 300 is able to maintain data in memory 150 absent any power from processor 110. It should be appreciated that refresh controller 300 need not provide RST and CKE signals for the totality of memory 150. Rather, refresh controller 300 can be configured to only provide maintenance to those portions of memory 150 that contain the context information (as determined via the pointers saved in memory 350).

Once the context data is stored, pointers are stored, and refresh controller 300 is activated, processor 110 can begin to power down. Specifically, power is removed from memory PHY's 140. At this point, refresh controller 300 is responsible for maintenance of memory 150. Power is then removed from (or lowered at) processor 110 via switch 120 or otherwise. Accordingly, portions of memory 150 identified by the pointers is maintained while processor 110 is in a low (or no) power mode, block 430.

At some later point, it is desired for processor 110 to resume its powered up mode. System controller 100 receives a signal from the operating system that calls for an end to the low power mode, block 610, and provides a remote power control interface for processor 110. Power is re-connected to processor 110, block 710, and system controller issues a "reset" signal, block 720. Once power is again provided to processor 110, via switch 120 or otherwise, block 620, the processor power-up process is started.

During power-up, three processes are performed in parallel. The three processes are PCIe Bus Training, block 510; processor restoration and initialization, block 520; and memory interface training, block 530.

PCIe bus training, block 510, starts communication over the PCIe bus and then "trains" the bus to enable higher speed communication thereacross. Provided that the processor state has been restored (discussed below), an updated I/O management unit (GART) can be transferred across the trained PCIe bus from system memory 350 and used to update processor 110, block 730.

SMU 130, now powered, is able to receive data from system controller 100 via secondary line of communication 310. SMU 130 asks System Controller 100 (over secondary line of communication 310 (also referred to as the System Controller Interface) if connected standby state has to be entered, and if memory 150 is in self-refresh mode. SMU 130 further asks for and obtains the location of context data in memory 150 and for restore instructions (the memory pointers), block 630.

After the reset signal is received, 720, the interface with memory 150 is enabled. In one embodiment, memory 150 operates using the Graphics Double Data Rate, version 5 standard (GDDR5). The GDDR5 interface is enabled in self-refresh mode. This allows mPHY 140 to resume maintenance responsibilities for memory 150. Thus, DSF control 300 is then disabled. Memory 150 is then put into strobe mode where memory 150 sends out a strobe signal to provide for data alignment. This provides an un-trained data path between memory 150 and processor 110. Thus, SMU 130 then reads out stored "resume buffers" identified by the pointers provided by system controller 110. Obtaining these resume buffers allows processor 110 to obtain the context data and processor state data, block 640. After this data is transferred to processor 110, memory interface training is performed, block 530.

Once processor 110 has the context data and processor state data, SMU 130 performs restoration and initialization of processor 110, block 520. Once restoration and initialization is complete, PCIe training is complete, and memory training is complete, processor 110 is in a Connected Standby state.

Accordingly, various power-up processes proceed in parallel to reduce the time needed to get processor 110 into the Connected Standby state and ready to receive further data over a trained PCIe bus 160.

It should be appreciated that while a certain subset of operations are described herein, it is envisioned that embodiments exist where additional operations are necessary or desired to produce a "ready" state of the processor. One such operation is initiating contact with a remote cloud server after access over PCIe bus 160. In such an embodiment, wireless contact is initiated immediately after reset and the contact process is run in parallel with any remaining startup processes being run on processor 110, such as the update of the GART.

Additionally, the above disclosure has described a complete shutdown of processor 110. Embodiments are envisioned where only portions of processor 110 (such as PHY 140) are shut down. In such examples, certain operations (such as PCIe training, when the PCIe bus is never powered down) are not needed to achieve readiness. Accordingly, the concepts described herein are readily applicable to partial processor shut downs. In such examples, those processes needed to place the previously shutdown portions of processor 110 into a ready state are executed in parallel.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of holding a processor in a low power mode including:
   storing context data in local memory controlled by and dedicated to the processor, context data indicating a desired state of the processor upon exiting the low power mode;
   storing pointers to the context data in a system controller memory; and
   maintaining a portion of the local volatile memory identified by the pointers while the processor is in the lower power mode.

2. The method of claim 1, wherein the pointers indicate less than all of the local volatile memory dedicated to the processor.

3. The method of claim 1, wherein the desired state of the processor is a last state of the processor prior to the processor entering the low power mode.

4. The method of claim 1, wherein the context data is stored within multiple buffers of the local volatile memory, and wherein a startup sequence may utilize less than all of the buffers.

5. The method of claim 1, wherein the context data further includes instructions regarding steps needed to be taken to take the processor out of the lower power mode.

6. A method of placing a processor in a low power mode including:
   storing processor state information in volatile memory controlled by and dedicated to the processor;
   storing pointers to locations within the volatile memory where the state information is stored;
   placing the volatile memory into a self-refresh mode;
   engaging an external controller to facilitate the self-refresh mode of the volatile memory; and
   placing the processor into a low power mode such that the processor is unable to facilitate the self-refresh mode.

7. The method of claim 6, wherein the pointers are stored on a system controller.

8. The method of claim 6, wherein the low power mode is a no power mode.

9. A computing device including:
   a processor;
   a system controller;
   a first volatile memory dedicated to the processor, the first volatile memory storing first information regarding a desired state for the processor;
   a second memory storing data pointers to the first information, the second memory being accessible to the system controller; and
   a controller operable to manage the refreshing of the first volatile memory while the processor is in a low power mode.

10. The device of claim 9, wherein the controller is operable to cause a reset and clock enable signal to be supplied to the first volatile memory.

11. The device of claim 9, wherein the reset and clock enable signals are supplied via state logic.

12. The device of claim 9, wherein the controller is operable manage the refreshing of the first volatile memory by maintaining portions of the first memory identified by the data pointers while withholding maintenance signals from other portions of the first memory.

13. The device of claim 9, wherein the computing device is a mobile computing device operable to be powered via battery.

14. The device of claim 9 storing context data in the first volatile memory controlled by and dedicated to the processor, context data indicating a desired state of the processor upon exiting the low power mode;
   storing pointers to the context data in the second memory; and
   maintaining a portion of the first volatile memory identified by the pointers while the processor is in the lower power mode.

15. The device of claim 14 wherein the pointers indicate less than all of the first volatile memory dedicated to the processor.

16. The device of claim 14 wherein the desired state of the processor is a last state of the processor prior to the processor entering the low power mode.

17. The device of claim 14 wherein the context data is stored within multiple buffers of the first volatile memory, and wherein a startup sequence may utilize less than all of the buffers.

18. The device of claim 14 wherein the context data further includes instructions regarding steps needed to be taken to take the processor out of the lower power mode.

* * * * *